(12) United States Patent
Chen

(10) Patent No.: US 7,111,379 B2
(45) Date of Patent: Sep. 26, 2006

(54) EYEBROW PENCIL MAKING MACHINE

(76) Inventor: Ching Mei Chen, P.O. Box 63-298, Taichung (TW) 406

( * ) Notice: Subject to any disclaimer, the term of this patent is extended or adjusted under 35 U.S.C. 154(b) by 276 days.

(21) Appl. No.: 10/891,616

(22) Filed: Jul. 16, 2004

(65) Prior Publication Data

US 2006/0010680 A1    Jan. 19, 2006

(51) Int. Cl.
  *B23P 23/00*   (2006.01)
  *B23Q 7/00*   (2006.01)
(52) U.S. Cl. .................. 29/564; 29/441.2; 29/560
(58) Field of Classification Search ............. 29/564, 29/441.2, 530, 33 D, 33 P, 33 R, 783, 598, 29/563
See application file for complete search history.

(56) References Cited

U.S. PATENT DOCUMENTS

| | | | |
|---|---|---|---|
| 2,405,367 A * | 8/1946 | Nichols, Jr. .................. 144/28 |
| 6,171,096 B1 * | 1/2001 | Hood .......................... 425/461 |
| 6,591,488 B1 * | 7/2003 | Tachibana ..................... 29/783 |
| 6,708,385 B1 * | 3/2004 | Lemelson ..................... 29/563 |
| 6,745,454 B1 * | 6/2004 | Grimshaw et al. ............ 29/564 |
| 6,854,168 B1 * | 2/2005 | Booms et al. ............. 29/33 D |
| 6,868,767 B1 * | 3/2005 | Dunn .......................... 83/549 |
| 7,036,350 B1 * | 5/2006 | Dommer et al. .............. 29/598 |

* cited by examiner

*Primary Examiner*—Monica Carter
*Assistant Examiner*—Dana Ross
(74) *Attorney, Agent, or Firm*—Charles E. Baxley

(57) ABSTRACT

An eyebrow pencil making machine includes a trough disposed on a table for receiving pen containers, a board having a number of depressions to support the pen containers which may be fed along the board step by step, and two tool devices each having a tool member moveable to machine ends of the pen containers. A reservoir may supply a eyebrow material into bores of the pen containers via an outlet nozzle. A presser may engage with and retain the pen containers on the board. Two vibrator receptacles may receive and supply rear caps and front covers onto ends of the pen containers. A gilding may be applied onto the pen containers with a die member and a foil.

19 Claims, 20 Drawing Sheets

EYEBROW PENCIL MAKING MACHINE

BACKGROUND OF THE INVENTION

1. Field of the Invention

The present invention relates to an eyebrow pencil or lip pencil making machine having a series of worming or machining stations to make the eyebrow pencils in series, and to allowing the eyebrow pencils to be easily and quickly made automatically or in mass production.

2. Description of the Prior Art

Typical eyebrow pencils comprise an eyebrow materials to be filled or engaged into a pen container, and two caps to be attached to the front and the rear portions of the pen container, to suitably receive or retain the eyebrow materials within the pen container, and to prevent the eyebrow materials from being scraped or damaged by other objects.

However, a lot of machining or working processes are required to manufacture the eyebrow pencils, and include drilling holes in the pen containers, machining or cutting tapered surfaces in the ends of the pen containers, filling the eyebrow materials into the pen containers, attaching end caps or covers onto the ends of the pen containers, and applying or printing words or marks or other information onto the pen containers.

Each of the machining or working processes may require a number of workers and working machines or machine tools to manufacture the eyebrow pencils, such that the eyebrow pencils are required to be made by a lot of man powers, and such that the manufacturing cost for making the eyebrow pencils is greatly increased.

The present invention has arisen to mitigate and/or obviate the afore-described disadvantages of the conventional eyebrow pencil making machines.

SUMMARY OF THE INVENTION

The primary objective of the present invention is to provide an eyebrow pencil making machine including a series of worming or machining stations to make the eyebrow pencils in series, and to allowing the eyebrow pencils to be easily and quickly made automatically or in mass production.

In accordance with one aspect of the invention, there is provided an eyebrow pencil making machine comprising a table, a trough disposed on the table for receiving a plurality of pen containers, at least one board disposed on the table, and including a plurality of depressions formed thereon, to receive and to support the pen containers thereon, a feeding device for feeding the pen containers forwardly into the depressions of the board step by step, two tool devices disposed on the table, and each including a tool member provided therein, for engaging with and for machining ends of the pen containers, a moving device for moving the tool members toward and away from the pen containers, to allow the tool members to engage with and to machine the ends of the pen containers, a reservoir disposed on the table for receiving eyebrow material, and including an outlet nozzle for supplying the eyebrow material into bores of the pen containers, and a block slidably supported on the table, and movable toward and away from the pen containers, to move the pen containers toward the outlet nozzle of the reservoir, and to allow the eyebrow material to be filled into the bores of the pen containers.

The trough includes an inclined ramp provided therein to support and to supply tubular the pen containers forwardly. A bar may further be provided and rotatably supported on the table with a pivot axle, and a lever may further be provided and rotatably supported on the trough with a pivot pole, and the lever is movable relative to the bar, to feed the pen containers one by one.

The pivot axle includes a cam secured thereon, an arm is secured to the pivot pole and includes a fork having a groove formed therein to slidably receive the cam, and to the lever toward and away from the bar in reciprocating action.

A presser may further be provided and slidably supported on the table, and movable toward the board, to selectively engage with and to retain the pen containers on the board. The presser includes a plurality of projections extended downwardly therefrom, for engaging with and for pressing the pen containers onto the board.

The presser includes a column slidably attached to the table and movable up and down relative to the table, and a spring engaged onto the column, and engaged with the presser, for biasing the presser to engage with and to retain the pen containers on the board.

Each of the tool devices includes a vacuum opening formed therein for vacuuming chips cut from the pen containers by the tool members. The moving device includes two shafts coupled to and driven by a motor, and two links and cranks coupled between the shafts and the tool devices, to move the tool devices toward and away from each other in reciprocating action.

The block includes a cone-shaped cavity formed therein for forming an inclined surface on the pen container. The block includes a bracket secured thereto, and a cam rotatably supported on the table and engageable with the bracket, to move the bracket and the block toward and away from the pen containers.

The table includes a seat disposed thereon, a rod slidably engaged through the bracket and slidably engaged into the seat and having a rounded member secured thereto for engaging with the cam.

A vibrator receptacle may further be provided and disposed on the table for receiving and supplying rear caps, and an actuator tongue may further be provided and slidably disposed on the table and engageable with the rear caps, for forcing the rear caps onto ends of the pen containers respectively.

The vibrator receptacle includes an outlet pipe to receive the rear cap in series, a pedestal disposed below the outlet pipe and having a slot to receive the rear caps, and the actuator tongue is slidably engaged in the slot of the pedestal and is engageable with the rear caps supported on the pedestal.

Another vibrator receptacle may further be provided and disposed on the table for receiving and supplying front covers, and an actuator tongue is slidably disposed on the table and engageable with the front covers, for forcing the front covers onto ends of the pen containers respectively.

A die member may further be provided, and a foil may further be provided and engaged over the die member, and a conveyer device is disposed below the die member, to receive and to support the pen containers thereon, and to move the pen containers and the foil over the die member, to allow the foil to be applied onto the pen containers.

A frame may further be provided and supported on the table, and the die member is slidably and adjustably attached to the frame with a bolt. A spool and a pulley may further be provided and rotatably supported on the table, to receive the foil, and to have the foil to be unfolded from the spool and to be engaged around the pulley.

Further objectives and advantages of the present invention will become apparent from a careful reading of the detailed

DETAILED DESCRIPTION OF THE PREFERRED EMBODIMENT

Figure 1:
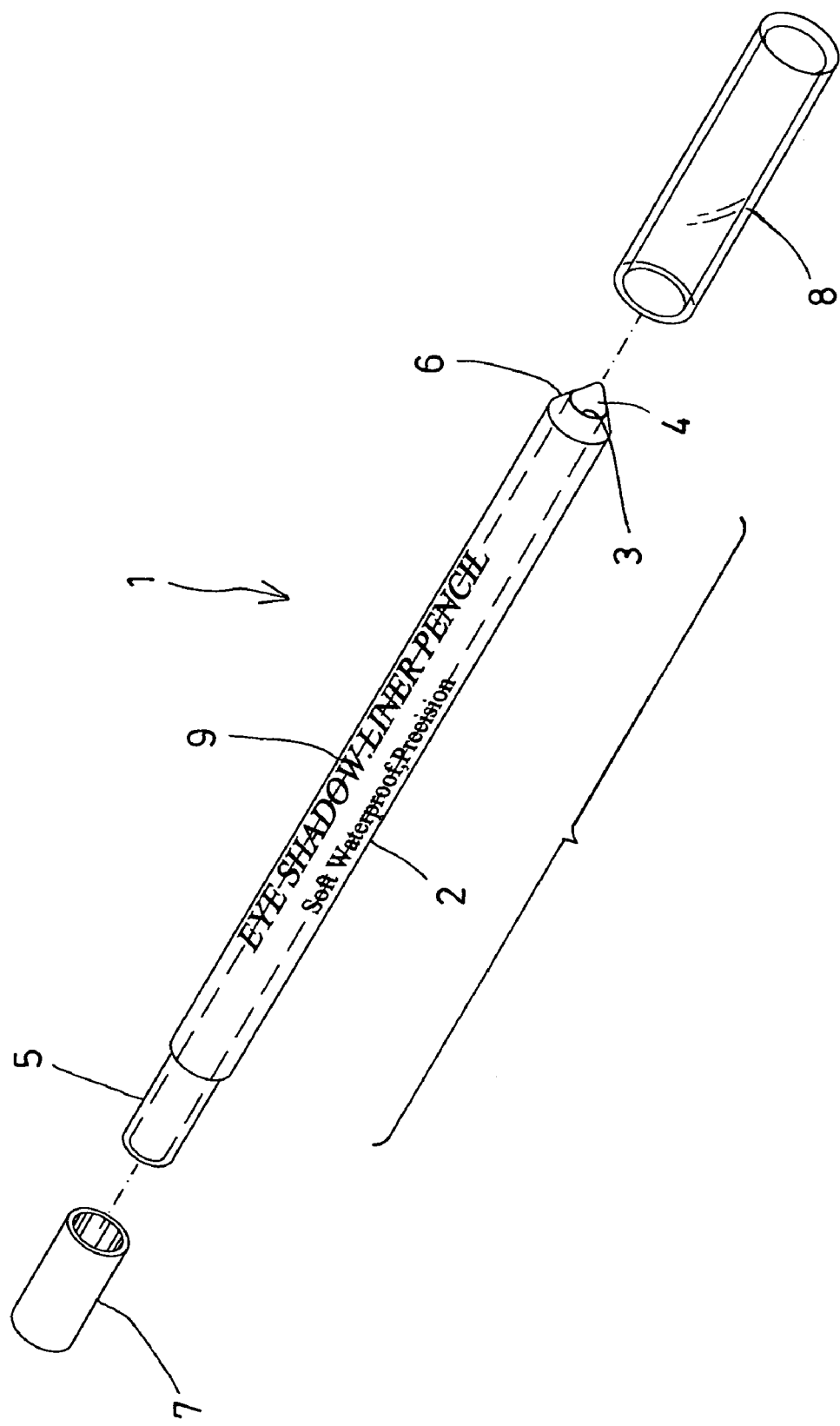
FIG. 1 is an exploded view of an eyebrow pencil to be made with an eyebrow pencil making machine in accordance with the present invention.
Figure 2:
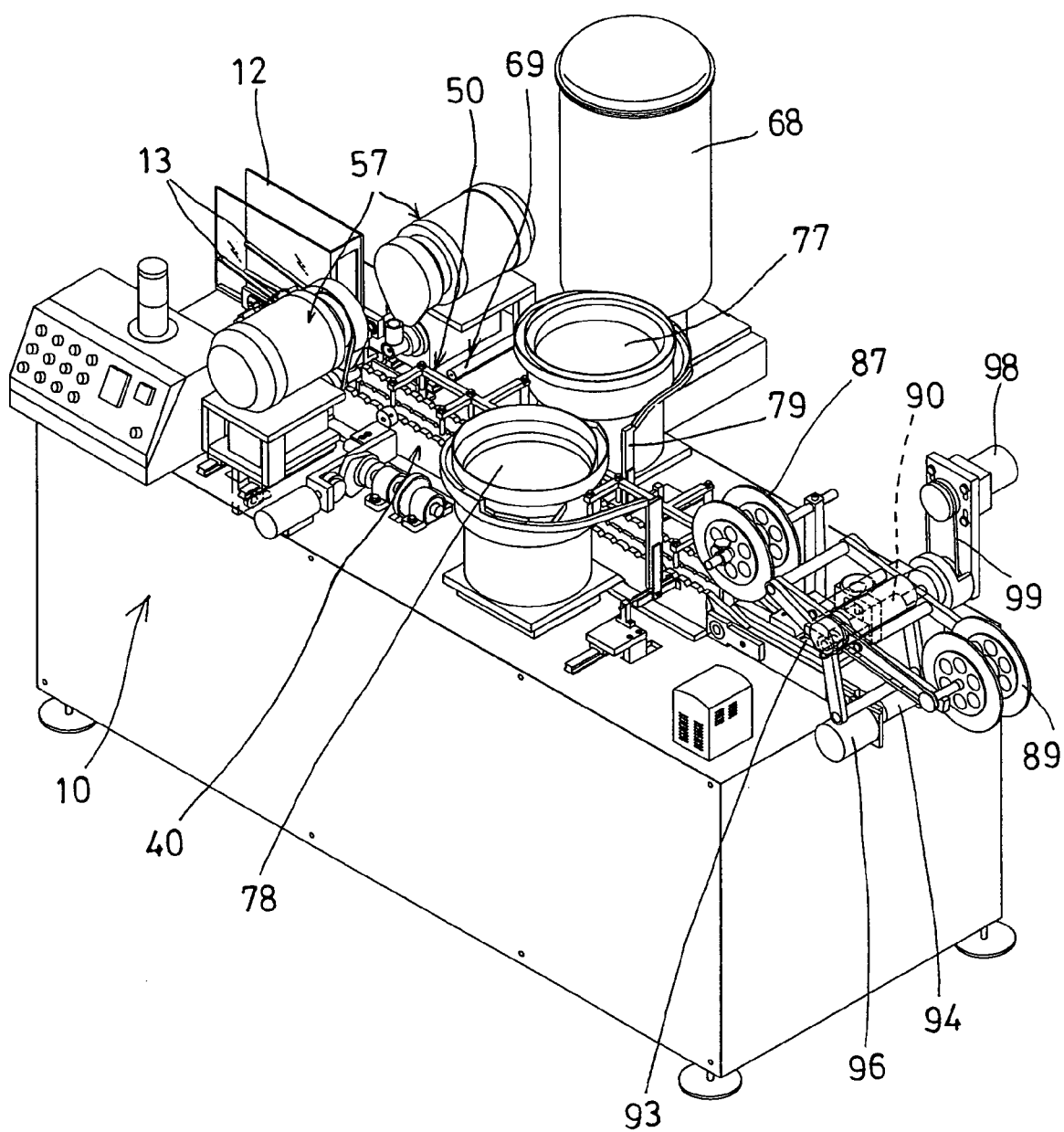
FIG. 2 is a perspective view of the eyebrow pencil making machine.

Referring to the drawings, and initially to FIG. 1, an eyebrow pencil 1 to be made by an eyebrow pencil making machine in accordance with the present invention comprises a tubular pen container 2 including a bore 3 formed therein for receiving an eyebrow material or core 4 therein, and including a peripheral recess 5 and an inclined surface 6 to be formed in the ends thereof, a rear cap 7 and a front cover 8 to be attached to the ends thereof, and a gilding 9 to be formed or applied onto the tubular pen container 2.

Figure 6:
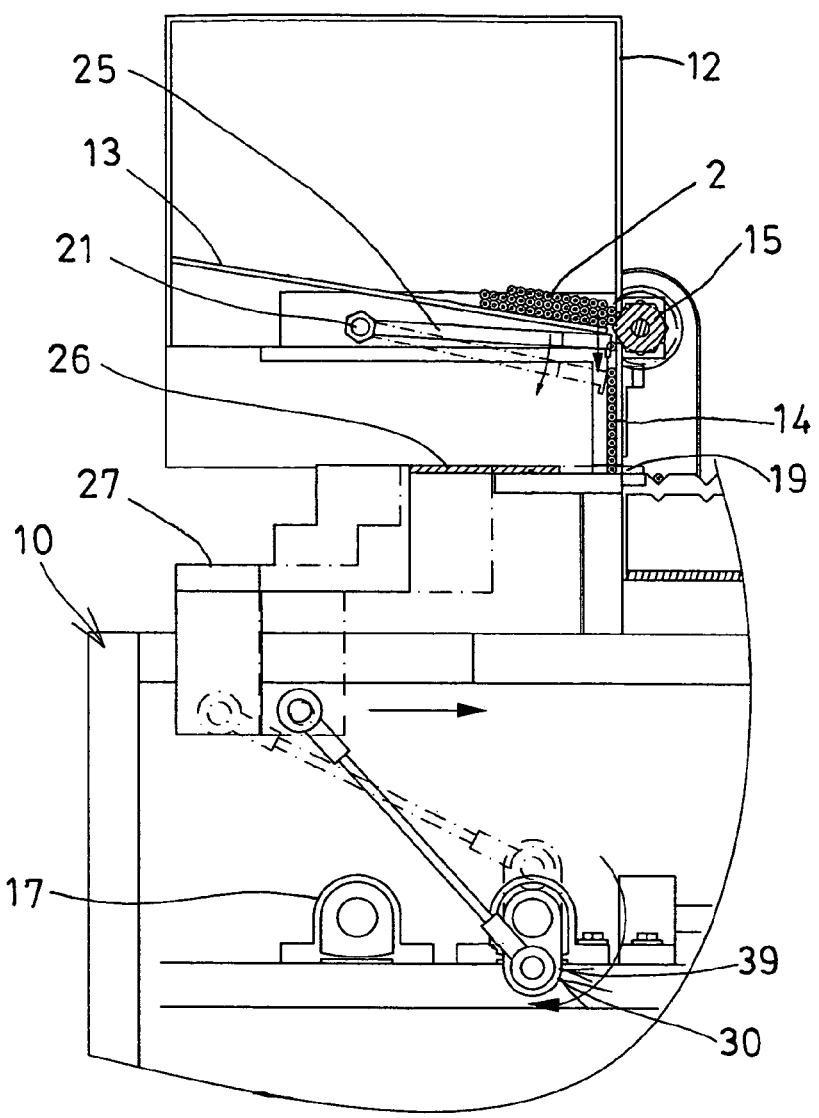
FIG. 6 is a partial cross sectional view taken along lines 6—6 of FIG. 5.

As shown in FIGS. 2–6, the eyebrow pencil making machine comprises a base 11 disposed or secured on one end of a table 10, and a feed trough 12 supported on the base 11 and having an inclined ramp 13 provided therein, to support and to guide and to supply tubular pen containers 2 of the eyebrow pencil 1 forwardly toward a front and vertical channel 14 of the base 11 (FIG. 6).

A hexagonal bar 15 is rotatably attached to the base 11 with a pivot axle 16 which is coupled to a motor 17 (FIGS. 3, 6) with a transmission or coupling device 18 (FIGS. 3, 5), such as a gearing device, or a pulley-and-belt device, or a sprocket-and-chain device 18, or the like. The base 11 includes a front outlet 19 formed therein (FIG. 5) and communicating with the vertical channel 14 of the base 11 (FIG. 6), for allowing the pen containers 2 to be moved out through the outlet 19 of the base 11.

An arm 20 has one end pivotally or rotatably attached to the base 11 or to the trough 12 with a pivot pole 21, and includes a fork 22 attached or provided to the other end thereof and having a groove 23 formed therein for slidably receiving a cam 24 which is also attached to the pivot axle 16 for the hexagonal bar 15, and a lever 25 is secured to the pivot pole 21 and rotated in concert with the pivot pole 21.

Figure 7:
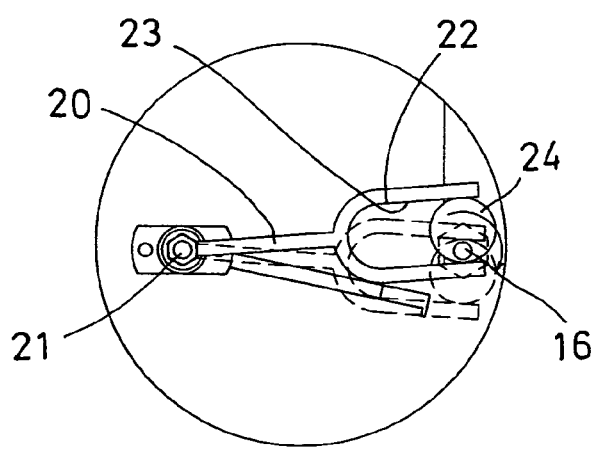
FIG. 7 is a partial front plan view of the pen container supplying device of the eyebrow pencil making machine.

The arm 20 and the pivot pole 21 and the lever 25 may be caused to be rotated or swung relative to the base 11 or the trough 12 in a reciprocating action, by the movement of the cam 24 in the groove 23 of the fork 22 (FIG. 7), and arranged for allowing the pen containers 2 to be fed or supplied into the vertical channel 14 of the base 11 one by one by the relative movement between lever 25 and the hexagonal bar 15.

A pusher 26 is formed or provided on a follower 27 which is slidably received on the base 11, and the pusher 26 is aligned with the outlet 19 of the base 11, for moving or supplying the pen containers 2 out through the outlet 19 of the base 11 one by one when the pusher 26 and the follower 27 are moved relative to the base 11, by such as a crank device 39 of a driving device 30 which will be discussed hereinafter.

Figure 3:
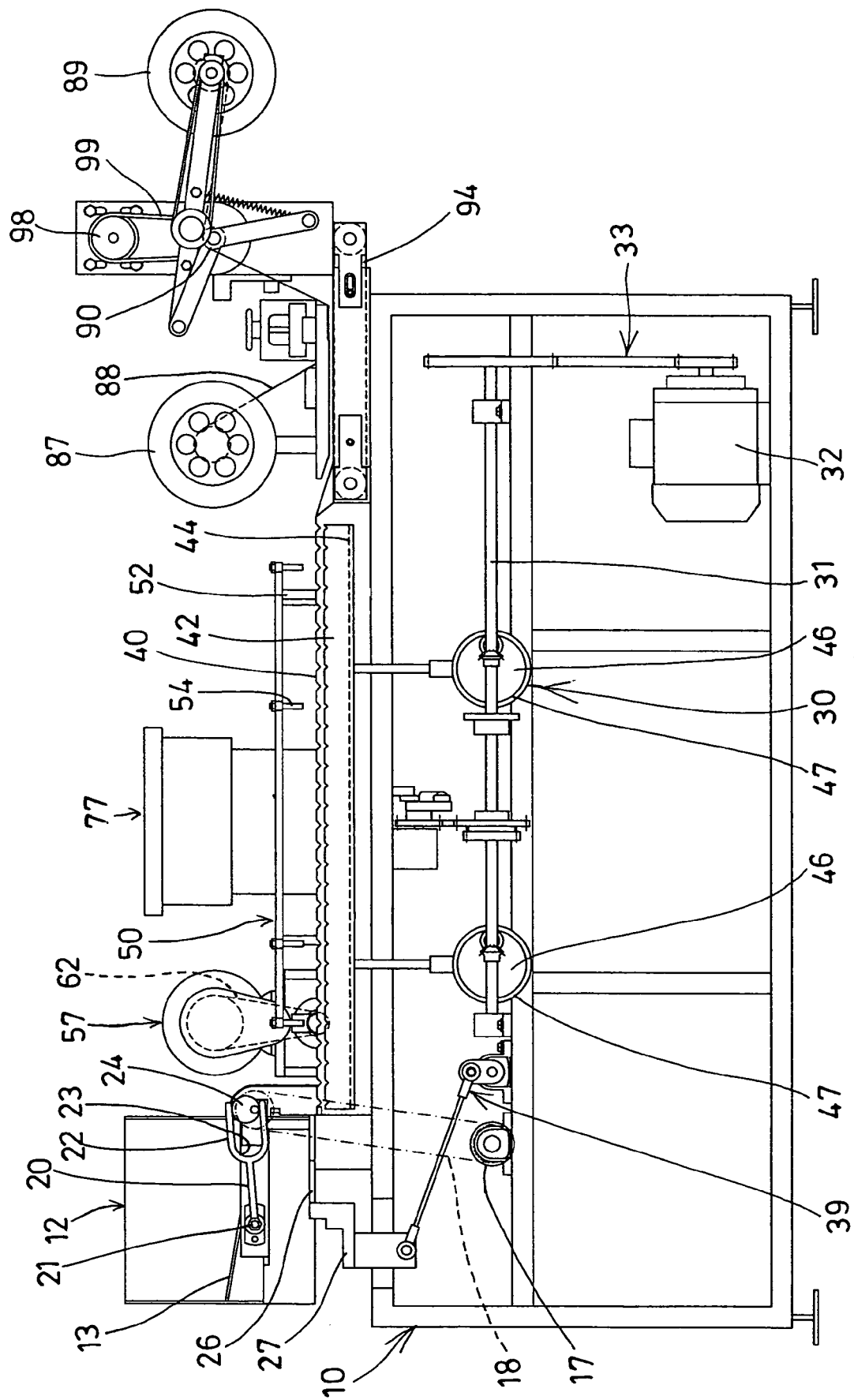
FIG. 3 is a front plan view of the eyebrow pencil making machine.
Figure 4:
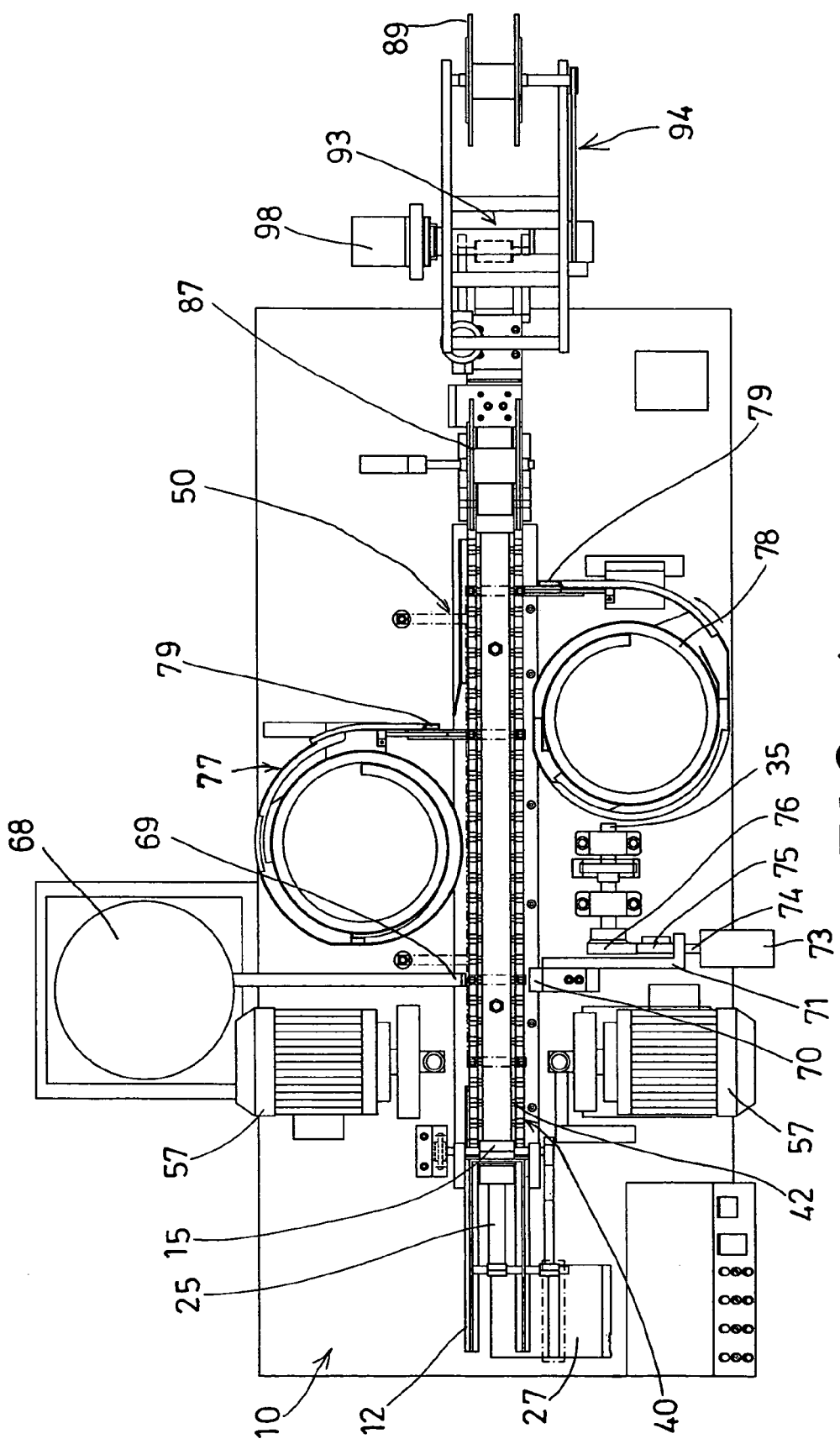
FIG. 4 is a top plan view of the eyebrow pencil making machine.
Figure 5:
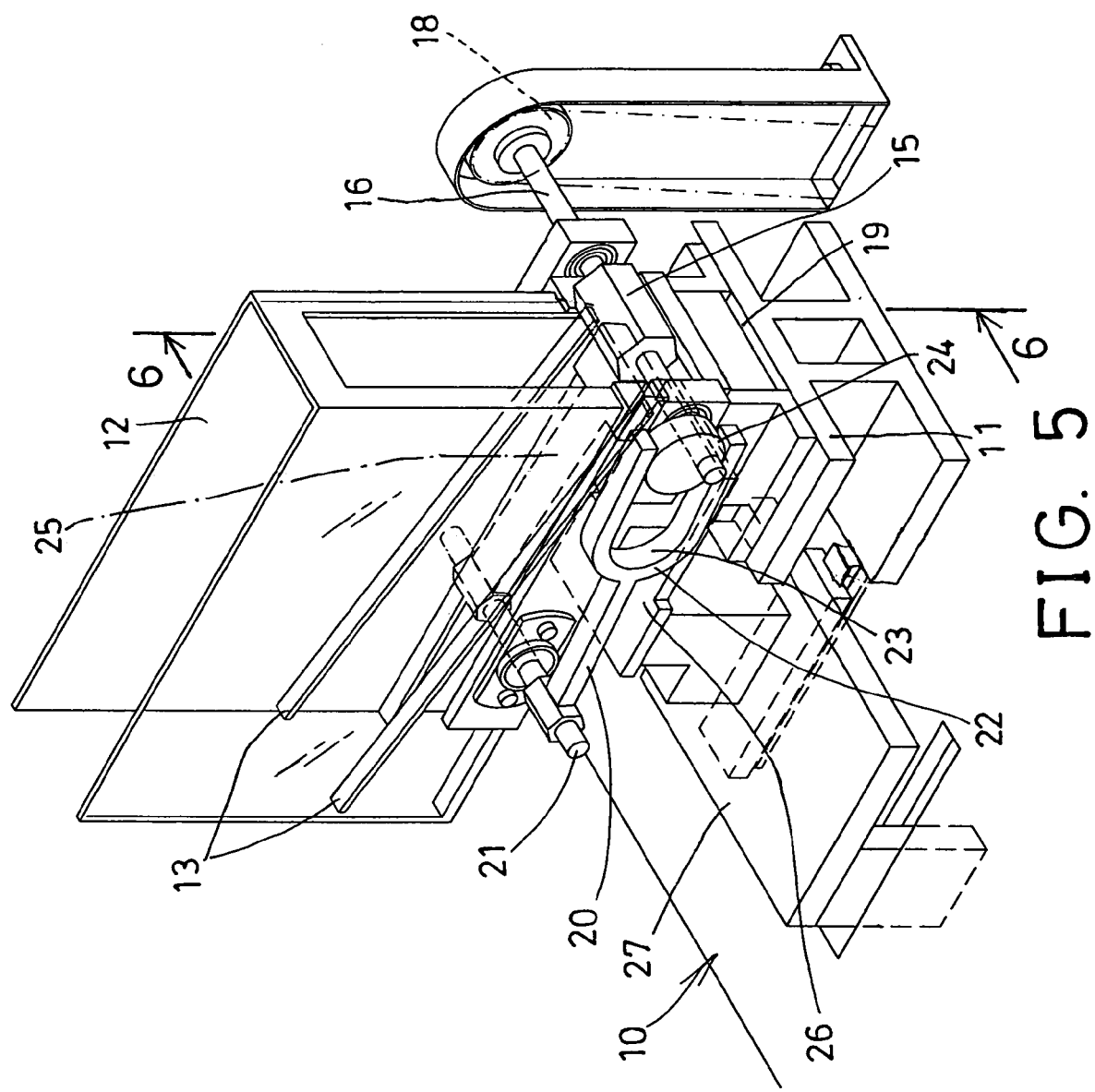
FIG. 5 is a partial perspective view illustrating a pen container supplying device of the eyebrow pencil making machine.
Figure 8:
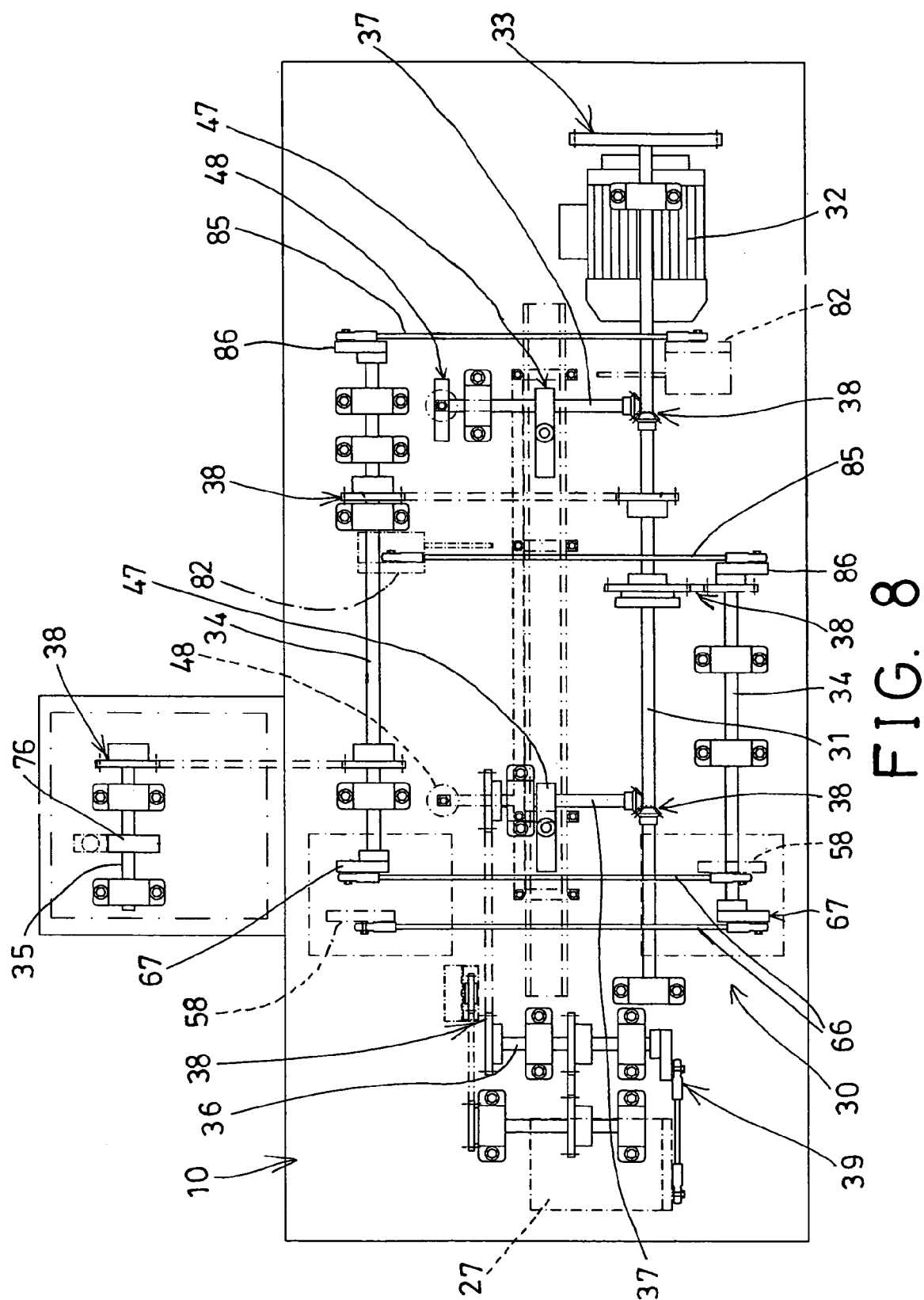
FIG. 8 is a top plan schematic view of a driving device of the eyebrow pencil making machine.

As shown in FIGS. 3 and 8, the driving device 30 includes a spindle 31 coupled to a motor 32 via another transmission or coupling device 33, such as a gearing device 33, or a pulley-and-belt device, or a sprocket-and-chain device, or the like; and includes one or more shafts 34, 35, 36, 37 coupled to the spindle 31 with the other coupling device 38, such as gearing devices, or pulley-and-belt devices, or sprocket-and-chain devices, or worm gears, or the like, for allowing the shafts 34–37 to be rotated or driven by the motor 32 via the spindle 31.

The crank device 39 may be coupled to one of the shafts 36 (FIG. 8), and coupled to the follower 27 (FIG. 3), for allowing the follower 27 and thus the pusher 26 to be moved relative to the base 11, by the motor 32 of the driving device 30 via the shaft 36 and the crank device 39, in order to move or supply the pen containers 2 out through the outlet 19 of the base 11 one by one.

Figure 9:
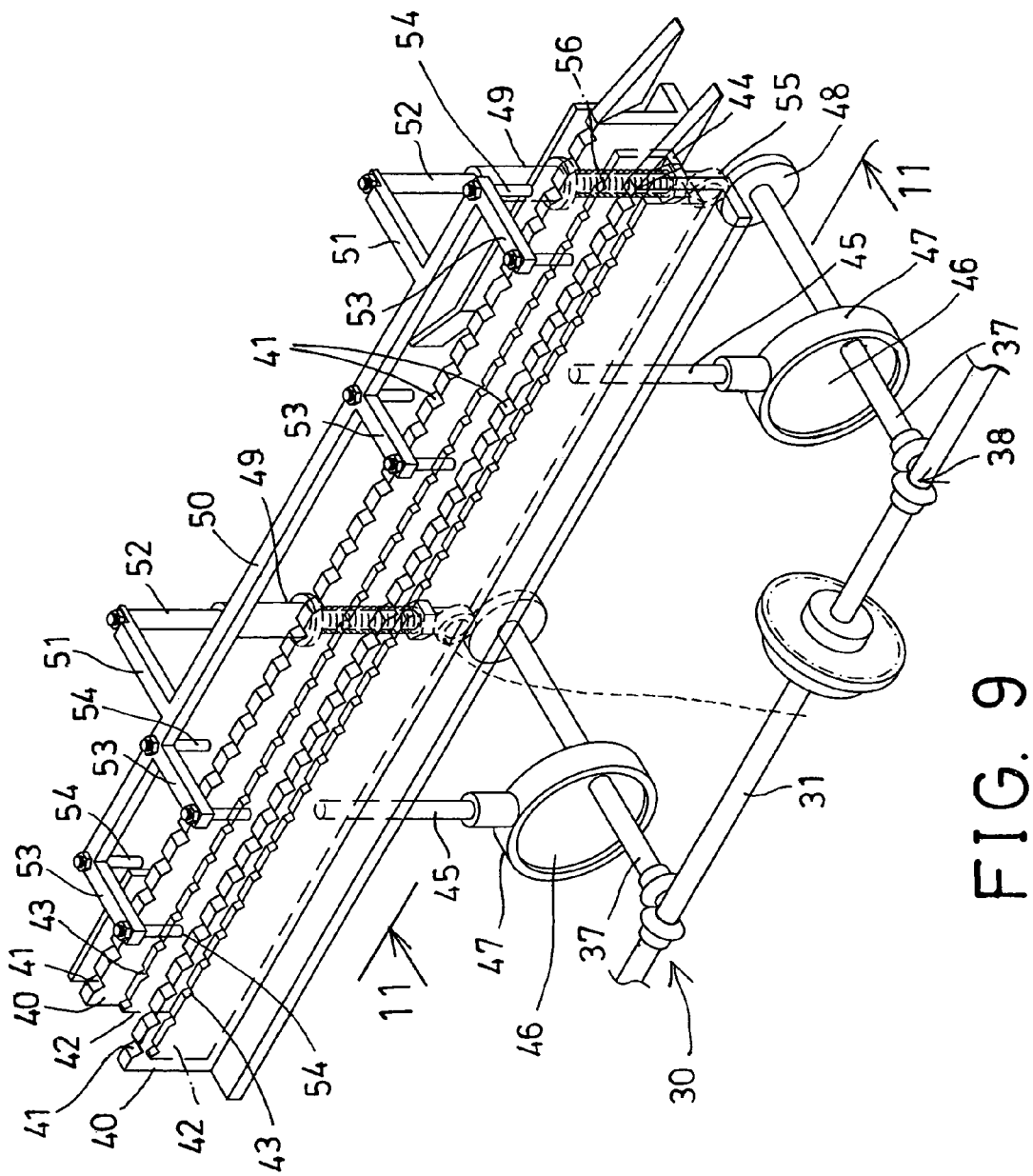
FIG. 9 is a partial perspective view illustrating a pen container feeding device of the eyebrow pencil making machine.
Figure 10:
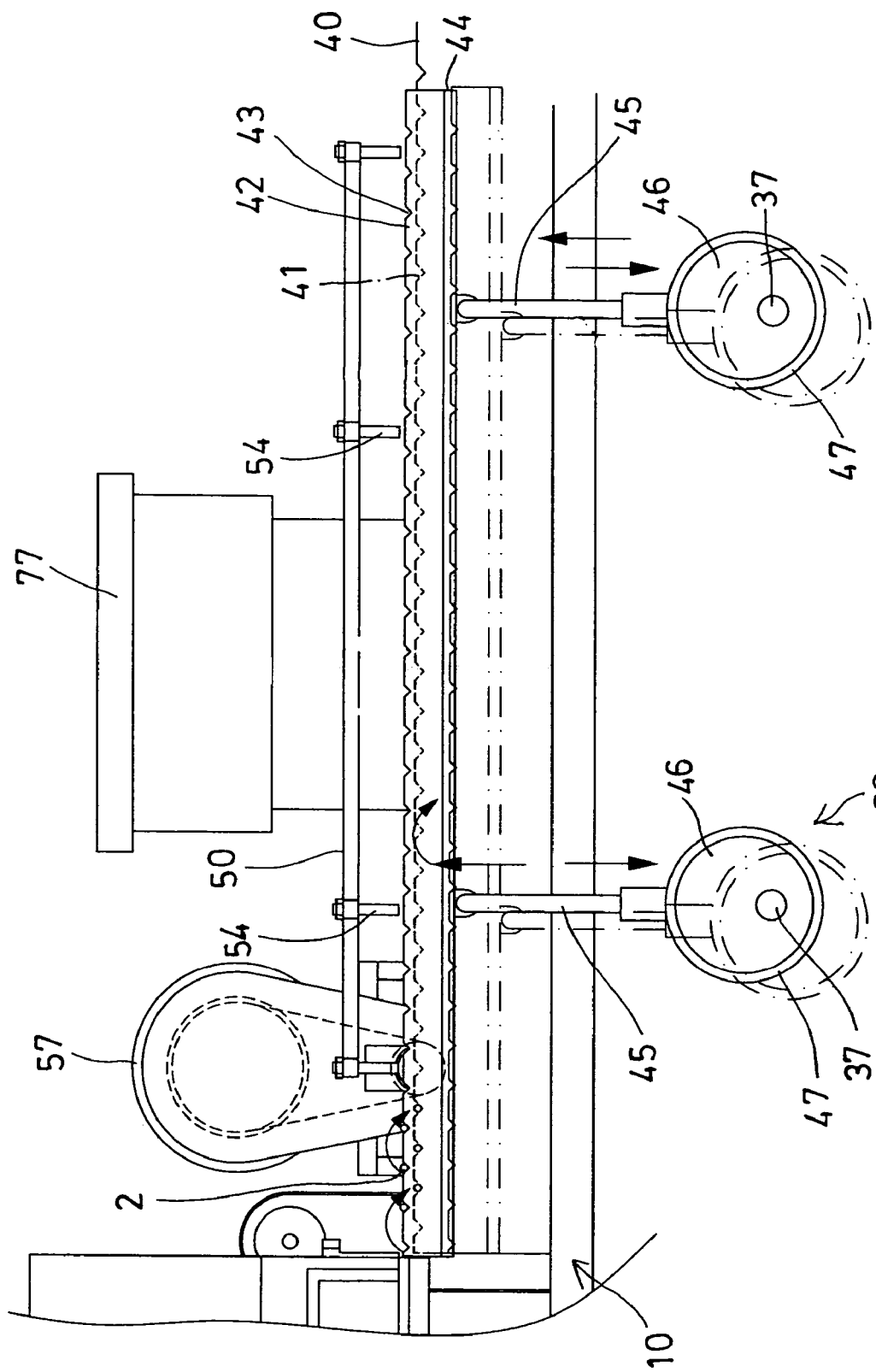
FIG. 10 is a partial front plan view of the pen container feeding device of the eyebrow pencil making machine.
Figure 11:
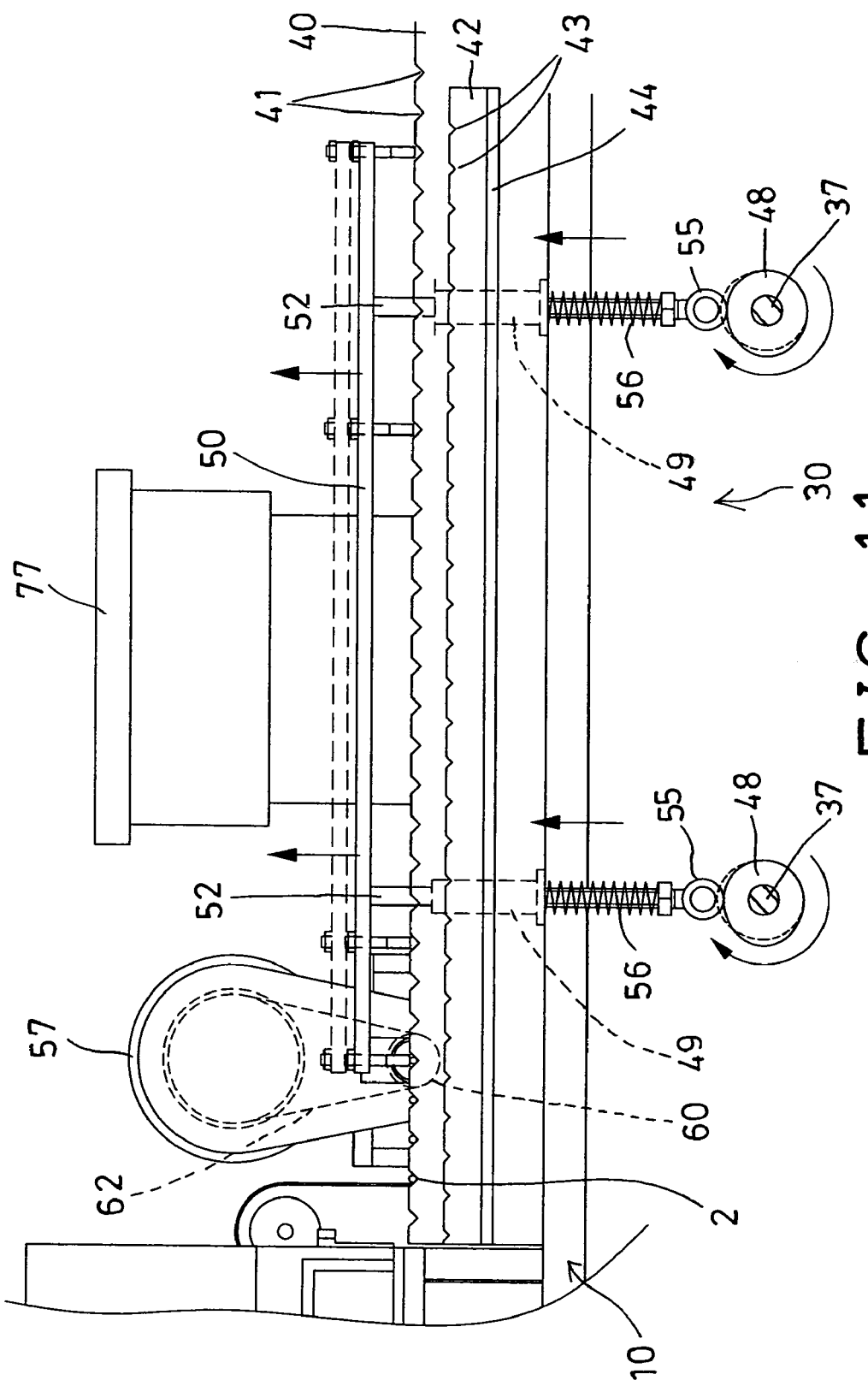
FIG. 11 is a partial cross sectional view taken along lines 11—11 of FIG. 9.

As shown in FIGS. 9–11, one or more, such as two boards 40 are fixed or secured on top of the table 10, and each includes a number of depressions 41 formed on top thereof, to receive the pen containers 2 moved or supplied out through the outlet 19 of the base 11, and one or more, such as two panels 42 are movably supported on the table 10 and disposed between the boards 40 and each also includes a number of depressions 43 formed on top thereof, to receive the pen containers 2, and to move or feed the pen containers 2 forwardly into the depressions 41 of the boards 40 step by step.

The panels 42 may be coupled together with a bottom wall 44 which may include one or more extensions 45 extended downwardly therefrom. One or more eccentric members or cams 46 are secured onto the shafts 37 and rotated in concert with the shaft 37 respectively, and each includes a ring 47 rotatably engaged thereon and coupled to the extensions 45 respectively, for moving the panels 42 upwardly and forwardly and then downwardly and rearwardly relative to the boards 40 in reciprocating action, so as to feed the pen containers 2 forwardly into the depressions 41 of the boards 40 or along the boards 40 step by step.

A presser 50 is also movably supported on the table 10 and disposed above the boards 40 and the panels 42, and includes a number of limbs 51, 53 laterally extended therefrom, and one or more columns 52 are secured to or extended from the limbs 51, and slidably engaged through barrels 49 which are secured to the table 10, such that the presser 50 may be guided to move up and down relative to the table 10 and the boards 40 and the panels 42 by the sliding engagements of the columns 52 in the barrels 49.

The presser 50 includes a number of projections 54 extended downwardly therefrom, such as extended from the limbs 53, and arranged above some of the depressions 41 of the boards 40, for being moved downwardly to engage with the pen containers 2, and to stably fix or retain the pen containers 2 on top of the boards 40, and thus for allowing the pen containers 2 to be machined or to be filled with the eyebrow materials 4 into the bores 3 of the pen containers 2. One or more spring members 56 are engaged onto the columns 52, to bias the projections 54 downwardly to engage with the pen containers 2.

As shown in FIGS. 9 and 11, each of the columns 52 includes a roller 55 rotatably attached to bottom thereof, for engaging with cams 48 that are secured to the shafts 37, and for allowing the columns 52 and thus the presser 50 to be moved up and down relative to the table 10 and the boards 40 and the panels 42 by the shafts 37, and thus for actuating the projections 54 of the presser 50 to selectively engage with and to retain the pen containers 2 on top of the boards 40.

Figure 12:
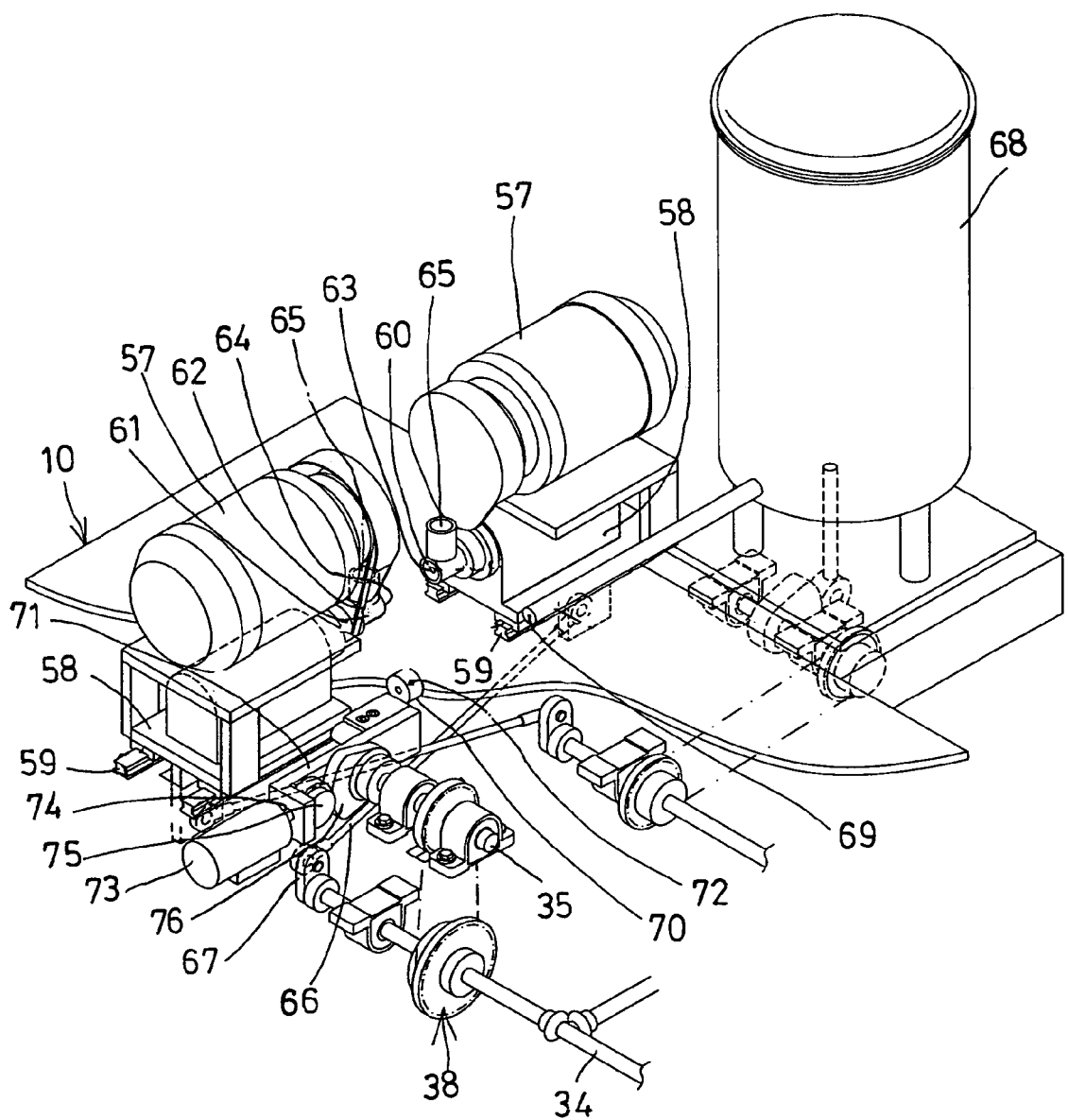
FIG. 12 is a partial perspective view illustrating a pen container machining device and an eyebrow materials filling device of the eyebrow pencil making machine.
Figure 13:
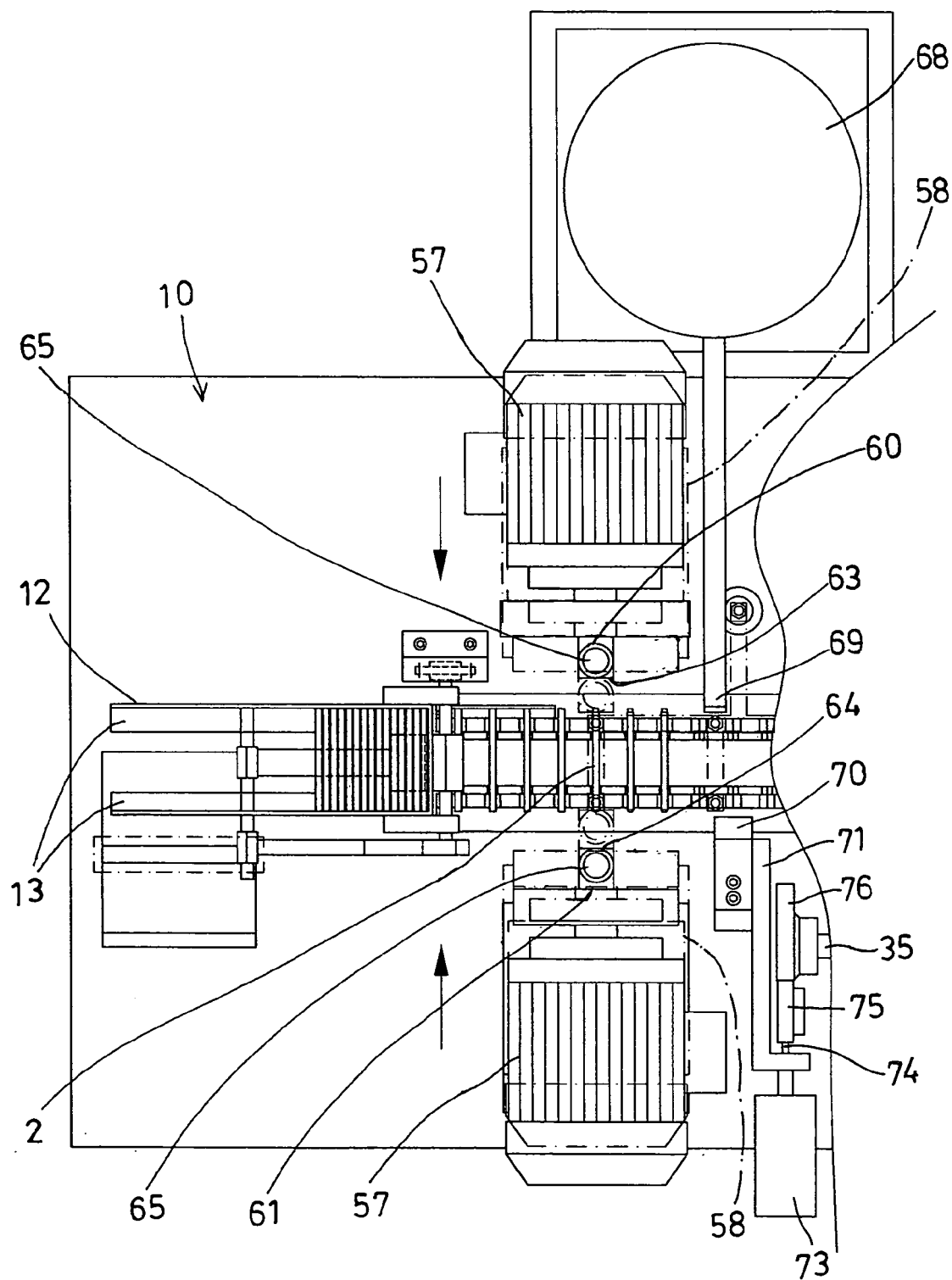
FIG. 13 is a partial top plan view of the pen container machining device of the eyebrow pencil making machine.
Figure 14:
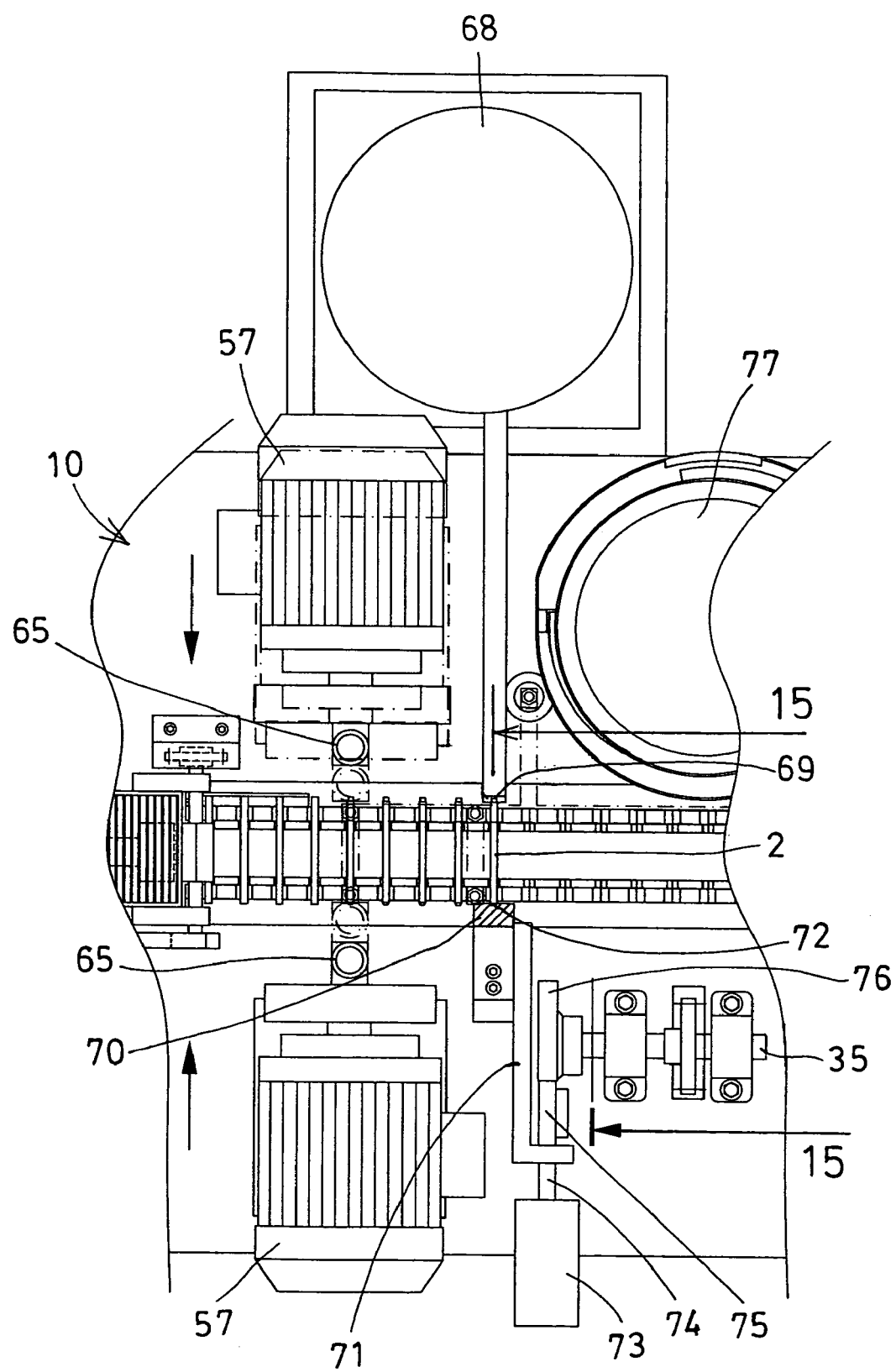
FIG. 14 is a partial top plan view of the eyebrow materials filling device of the eyebrow pencil making machine.

Referring next to FIGS. 12–14, and again to FIGS. 2–4, one or more, such as two motors 57 are disposed or secured on platforms 58 which are slidably engaged on rails 59 that are provided on top of the table 10, and arranged to allow the motors 57 to be moved toward each other. Two tool devices 60, 61 are coupled to the motors 57 with belts or couplers 62 (FIGS. 11, 12), for allowing the tool devices 60, 61 to be rotated or driven by the motors 57 respectively.

The tool devices 60, 61 may be moved toward and to engage with the pen containers 2 that are supported on top of the boards 40, and each includes a tool member 63, 64 provided therein, for engaging with and for machining the ends of the pen containers 2 into the peripheral recesses 5 and the inclined surfaces 6 (FIG. 1) respectively. Each of the tool devices 60, 61 includes a vacuum opening 65 for vacuuming or cleaning or drawing the chips cut from the pen containers 2 by the tool members 63, 64.

As shown in FIGS. 8 and 12, the motors 57 and/or the platforms 58 may be coupled to the shafts 34 with links 66 and cranks 67 respectively, to allow the motors 57 and the tool devices 60, 61 to be moved toward each other to engage with and to retain the pen containers 2 between the tool devices 60, 61, and to allow the pen containers 2 to be machined or cut by the tool members 63, 64 of the tool devices 60, 61 respectively.

Figure 15:
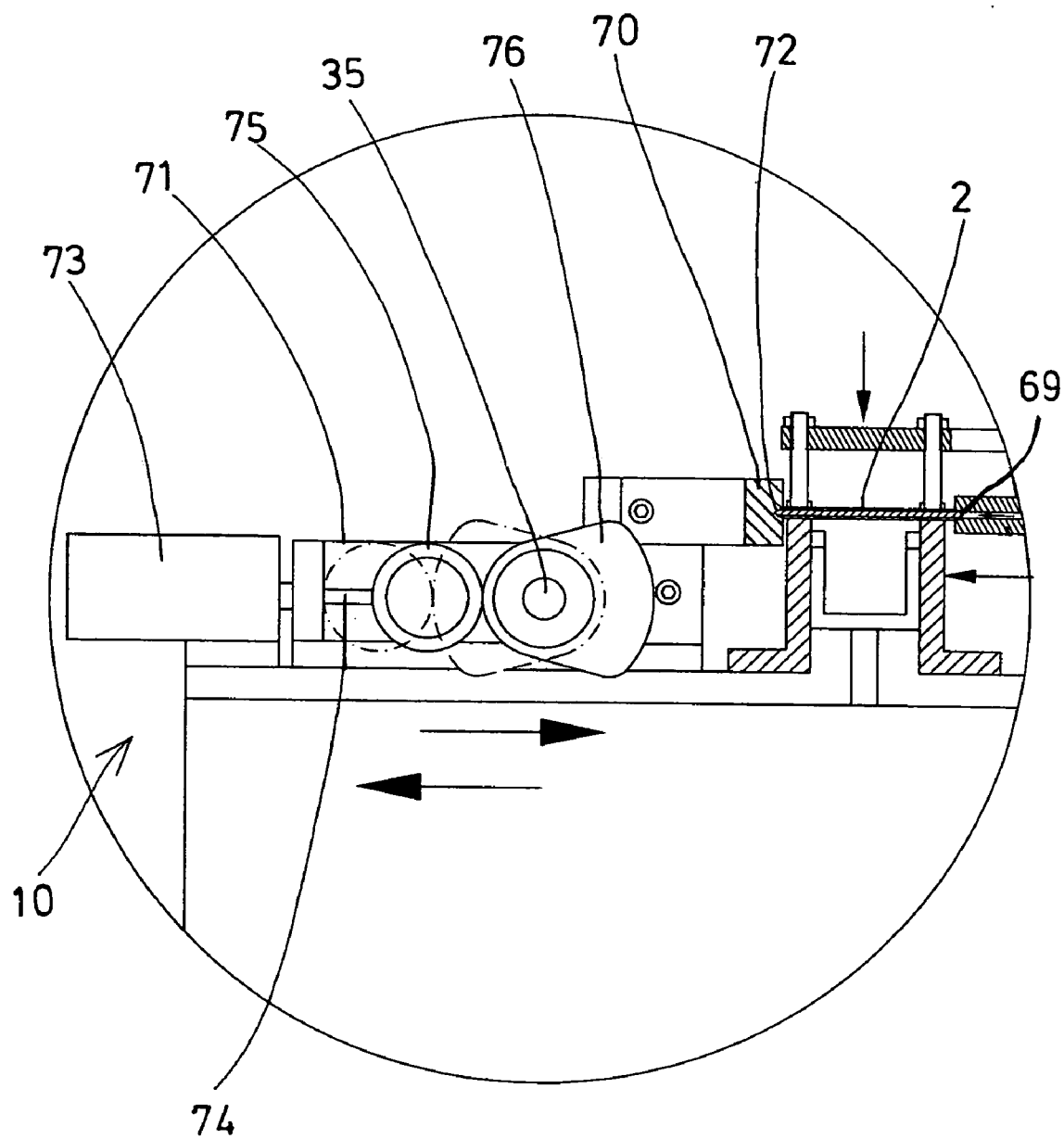
FIG. 15 is a partial cross sectional view taken along lines 15—15 of FIG. 14.
Figure 16:
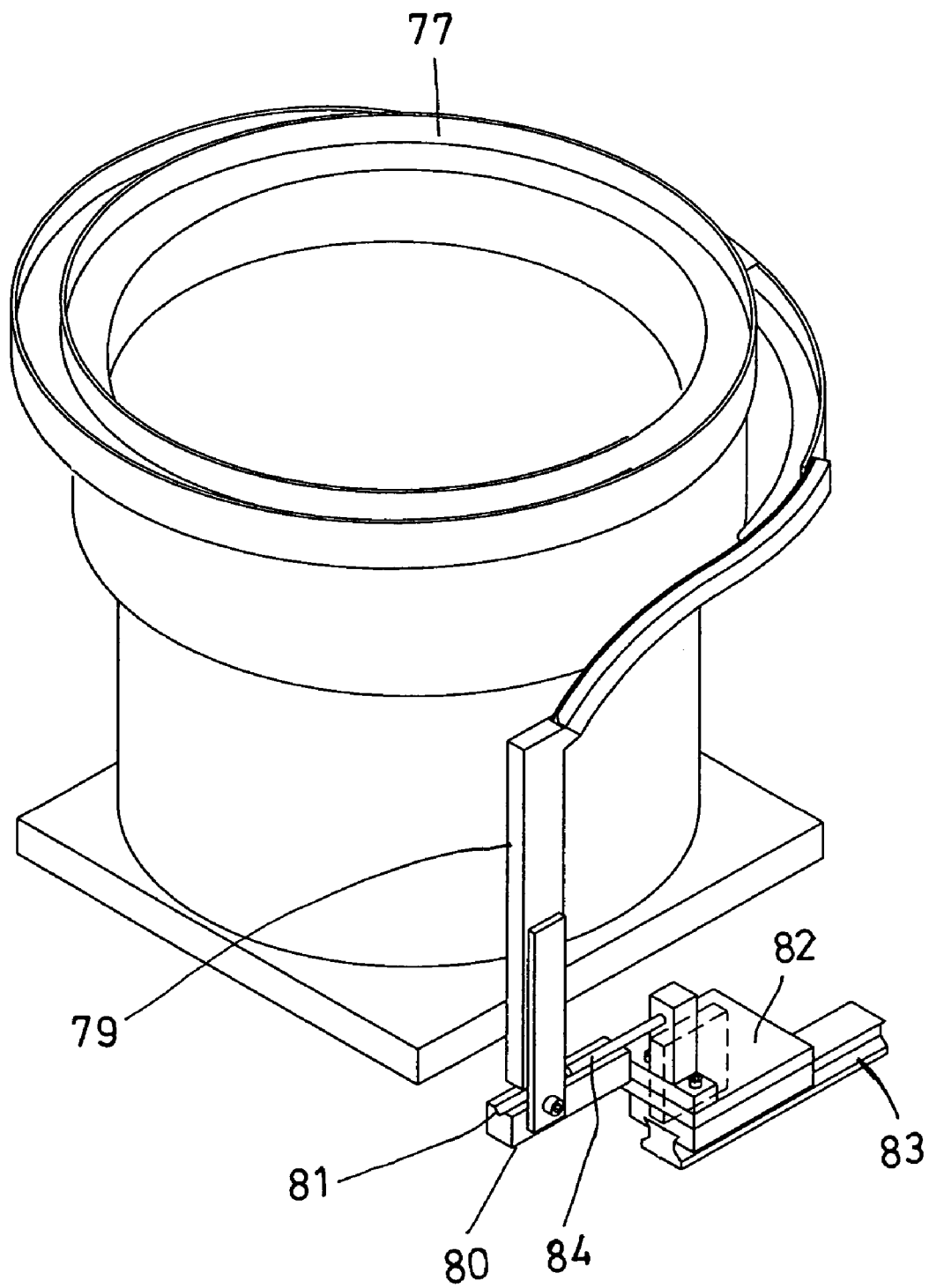
FIG. 16 is a partial perspective view illustrating a vibrator receptacle for receiving rear caps that will be supplied and engaged onto the pen containers.
Figure 17:
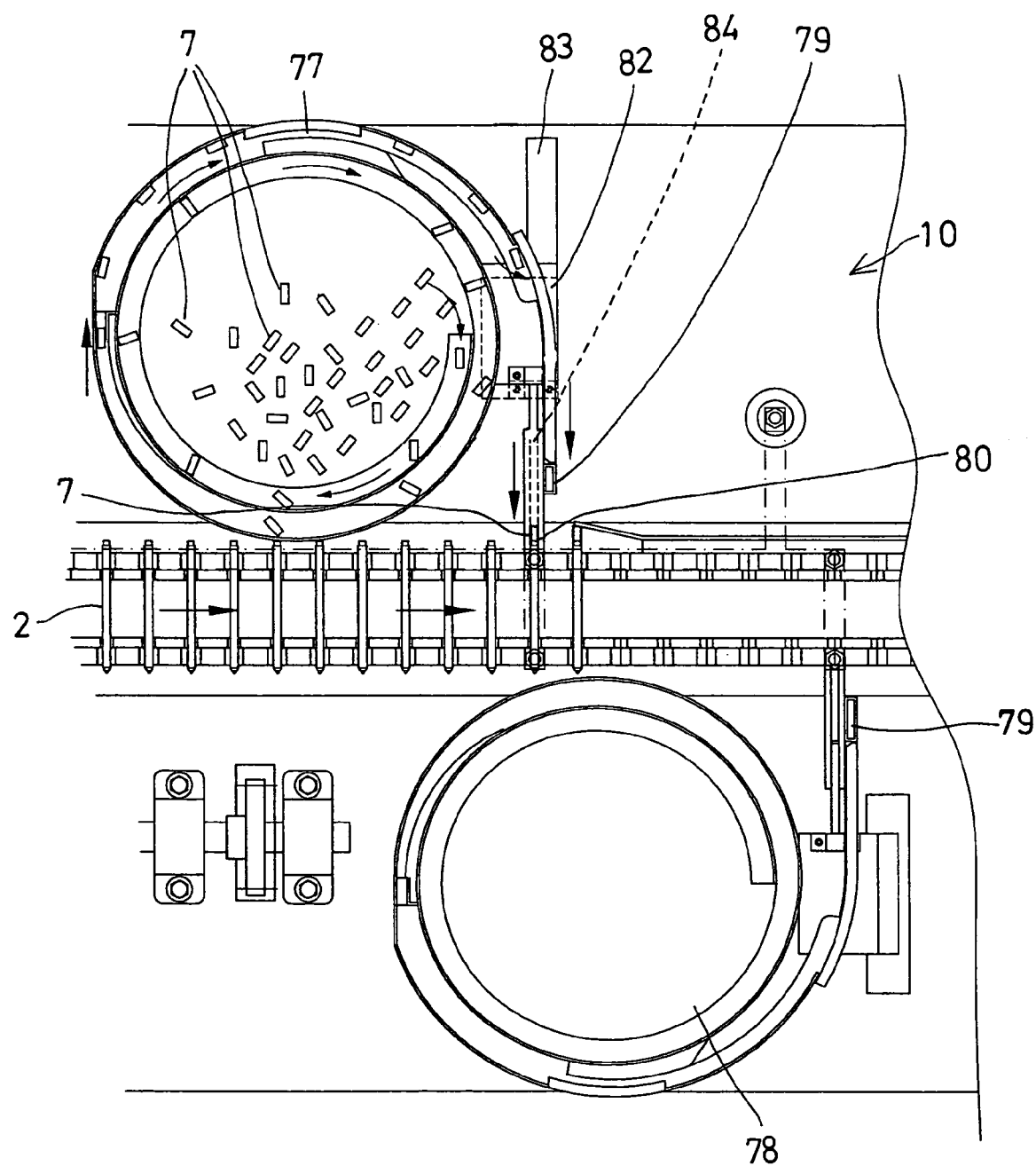
FIG. 17 is a partial top plan view illustrating the attachment of the rear caps onto the pen containers.
Figure 18:
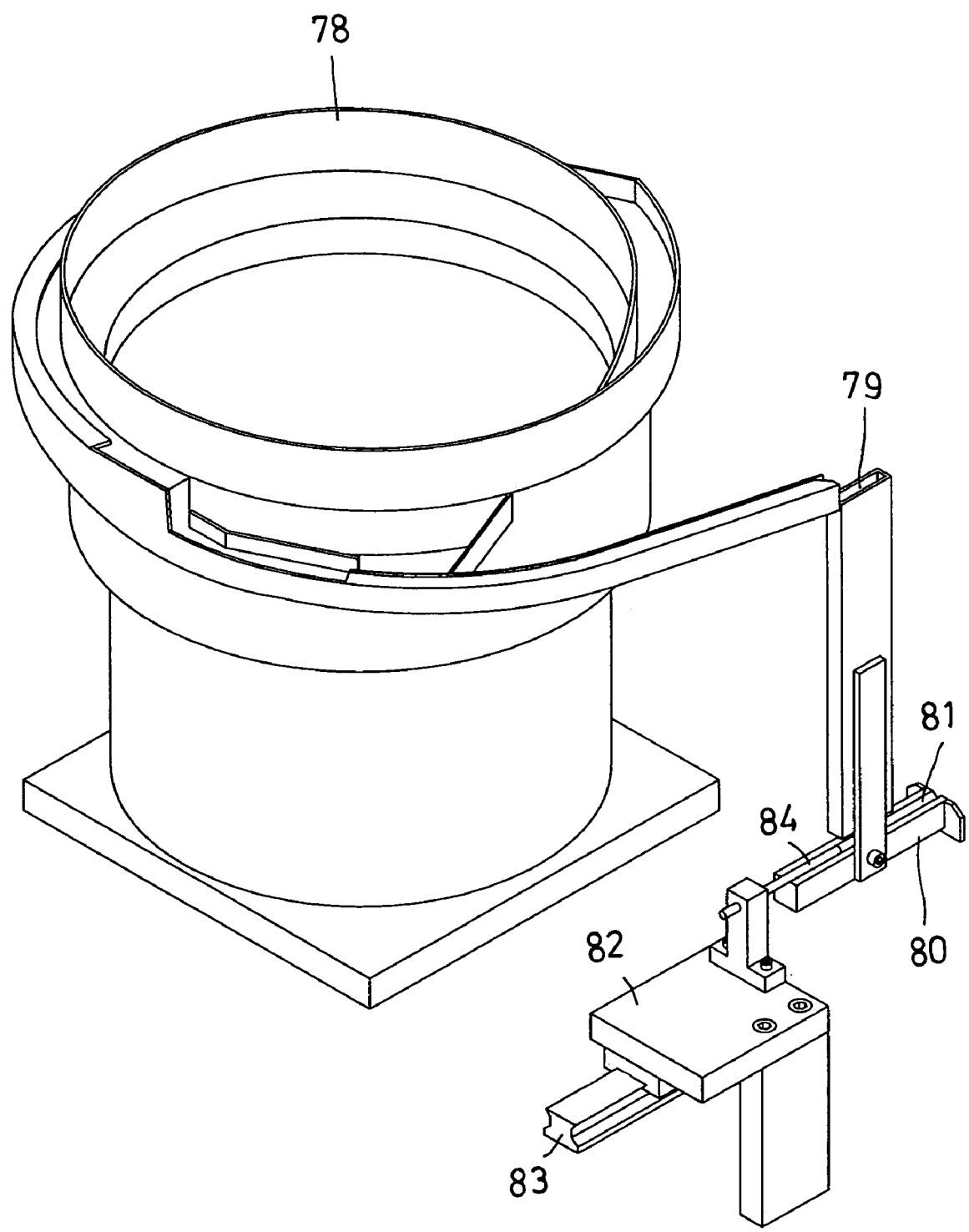
FIG. 18 is a partial perspective view illustrating another vibrator receptacle for receiving front covers that will be supplied and engaged onto the pen containers.
Figure 19:
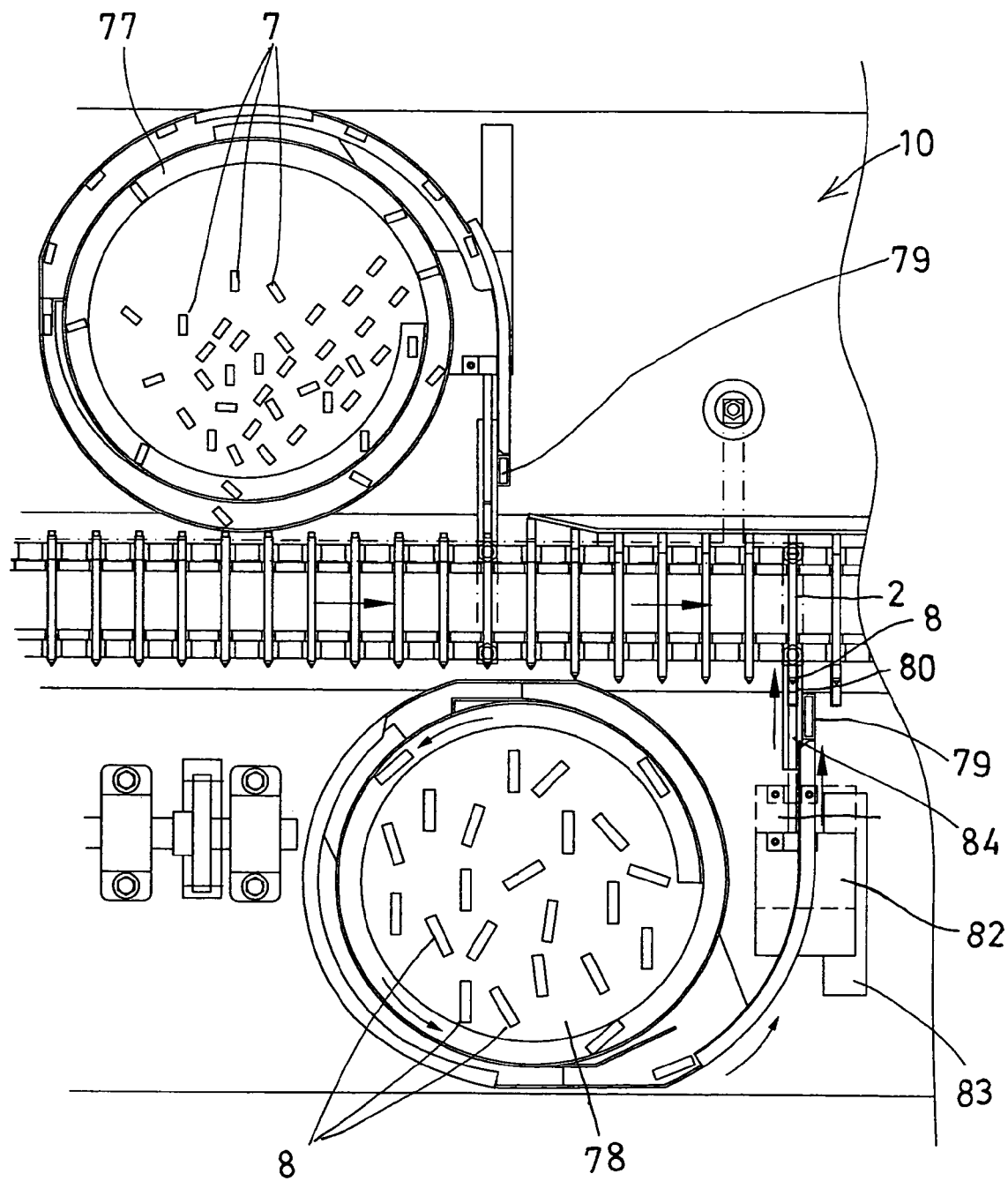
FIG. 19 is a partial top plan view illustrating the attachment of the front covers onto the pen containers.

A reservoir 68 is disposed on top of the table 10 for receiving the eyebrow material 4, and includes an outlet nozzle 69 for supplying or filling the eyebrow material into the bores 3 of the pen containers 2 respectively (FIG. 15). A block 70 is extended from or secured to a bracket 71, and is slidably supported on the table 10, and includes a cone-shaped cavity 72 formed therein (FIGS. 12, 14, 15) for forming the inclined surfaces 6 on the pen container 2 and/or on the core 4 of eyebrow material.

For example, a seat 73 is disposed on the table 10, a rod 74 is slidably engaged through the bracket 71 and slidably engaged into the seat 73, to slidably attach the bracket 71 to the seat 73 and thus to the table 10. A rounded member 75 is secured to one end of the rod 74. A cam 76 is secured to one of the shafts 35 (FIGS. 8 and 12–15), and engaged with the rounded member 75 or the rod 74, for moving the block 70 and the bracket 71 relative to the table 10, and thus for selectively moving the block 70 to engage with or to be disengaged from the pen containers 2 respectively.

In operation, as shown in FIGS. 14 and 15, the block 70 may be moved by the cam 76 to engage with and to force the pen containers 2 toward the outlet nozzle 69 of the reservoir 68, to allow the eyebrow material 4 to be supplied or filled into the bores 3 of the pen containers 2, and to form the inclined surfaces 6 on the core 4 of eyebrow material by the cone-shaped cavity 72 formed within the block 70.

Referring next to FIGS. 16–19, and again to FIGS. 2 and 4, two vibrator receptacles 77, 78 may further be provided and disposed on the table 10, for receiving the rear caps 7 and the front covers 8 respectively, and for allowing the rear caps 7 and the front covers 8 to be attached and engaged onto the pen containers 2 respectively. Each of the vibrator receptacles 77, 78 includes an outlet pipe 79 for receiving the rear caps 7 and the front covers 8 in series respectively.

Two pedestals 80 may further be provided and disposed below the outlet pipes 79 of the vibrator receptacles 77, 78 respectively, and each includes a slot 81 formed therein to receive the rear caps 7 and the front covers 8 from the outlet pipes 79 respectively. Two followers 82 are slidably engaged on rails 83 that are provided on top of the table 10, and each includes an actuator tongue 84 extended therefrom and arranged to engage in the slots 81 of the pedestals 80, and to engage with and to move and force the rear caps 7 and the front covers 8 onto the ends of the pen containers 2 respectively.

As shown in FIG. 8, two links 85 and two cranks 86 may couple the followers 82 to the shafts 34 respectively, to allow the followers 82 to be moved to slide along the rails 83 of the table 10 by the shafts 34 respectively, and then to actuate the actuator tongues 84 of the followers 82 to move and to force the rear caps 7 and the front covers 8 onto the ends of the pen containers 2 respectively.

Figure 20:
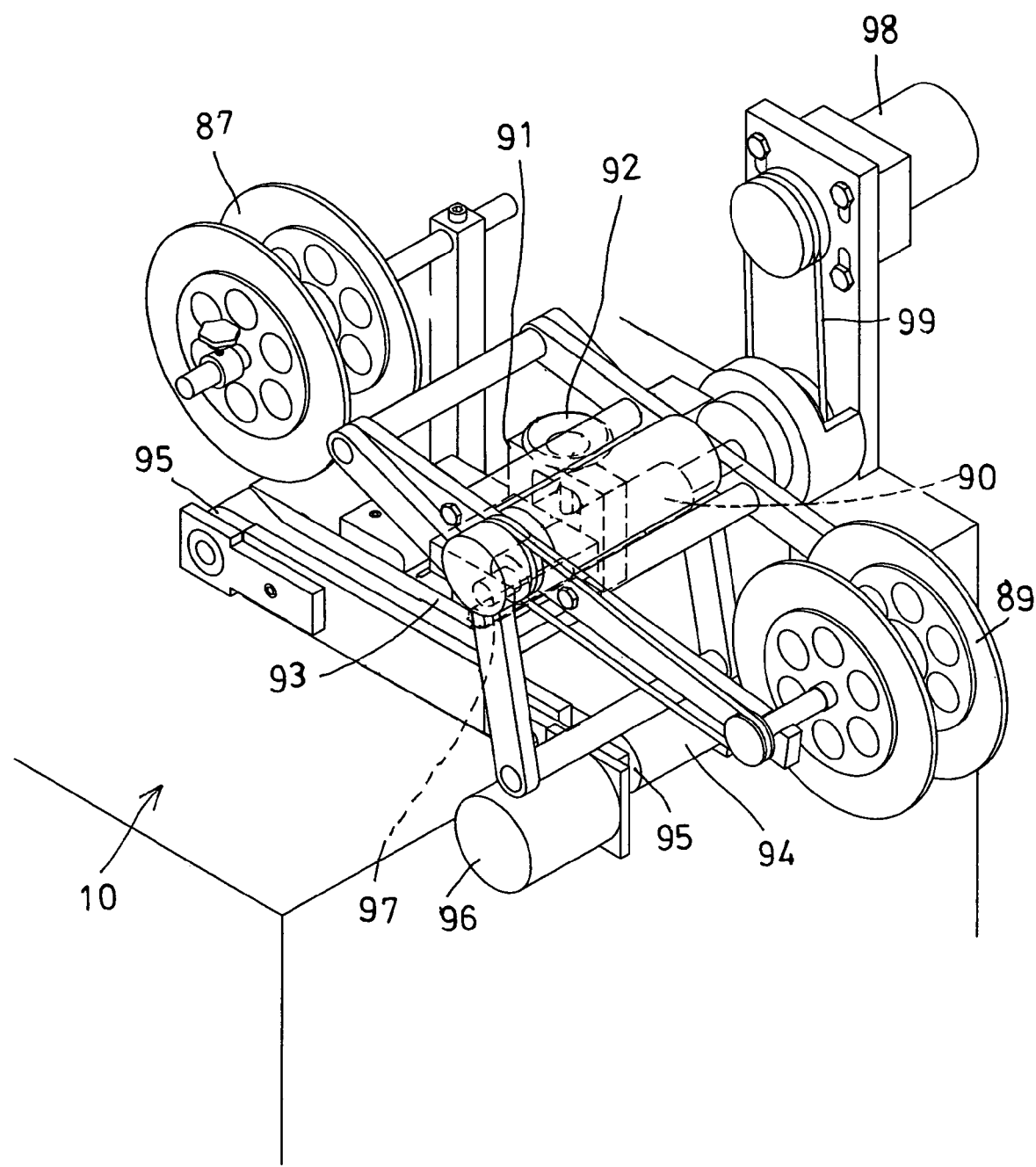
FIG. 20 is a partial perspective view illustrating a pen container gilding device of the eyebrow pencil making machine.
Figure 21:
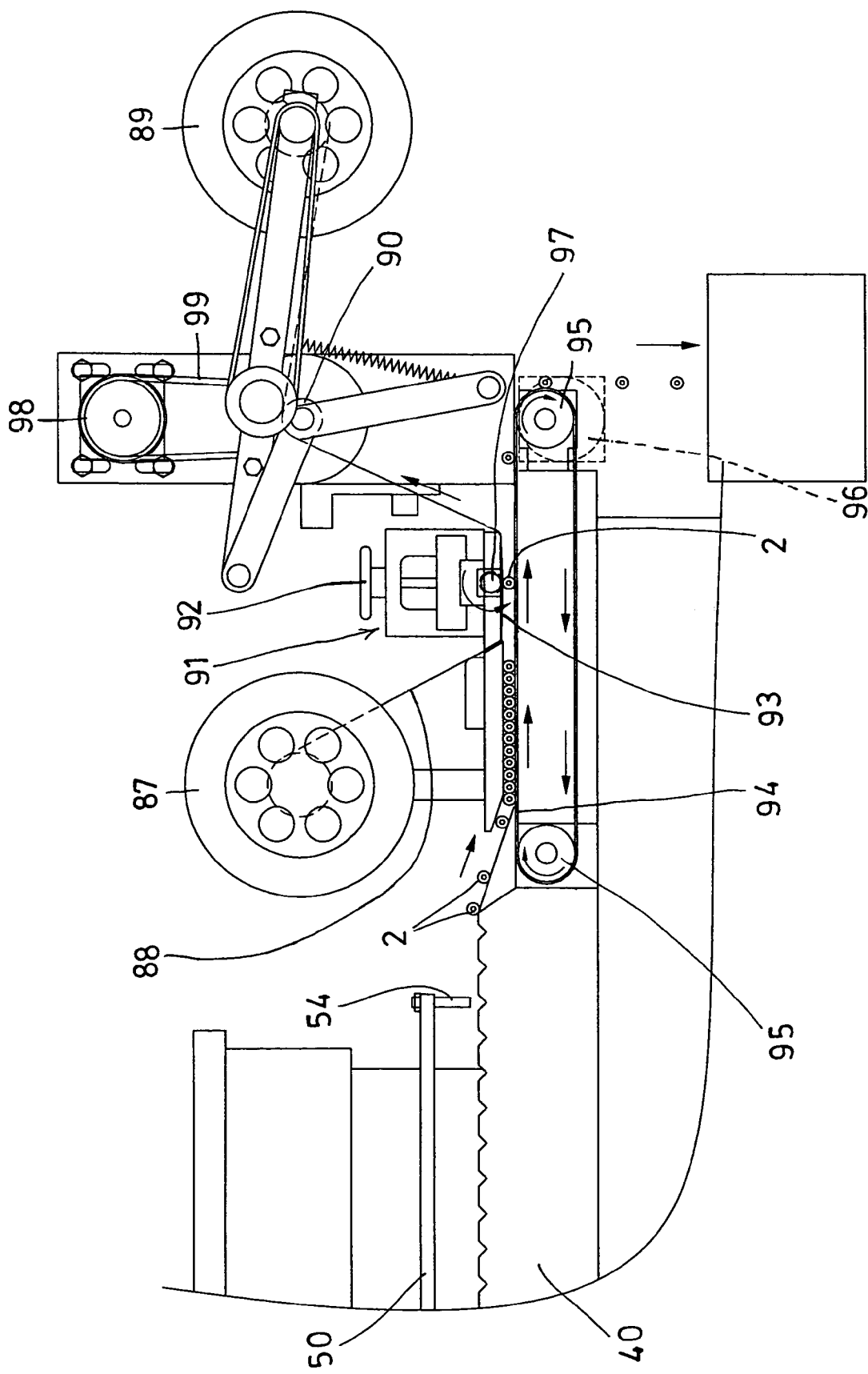
FIG. 21 is a partial front plan view of the pen container gilding device of the eyebrow pencil making machine.

Referring next to FIGS. 20–21, and again to FIGS. 2–4, a spool 87 is rotatably attached or supported on the table 10, and is provided to wind or support a gold foil 88 thereon, and a pulley 89 is also rotatably attached or supported on the table 10, and is coupled to the gold foil 88, to have the gold foil 88, unfolded from the spool 87, to be wound or engaged onto or received in the pulley 89 after a gilding process is conducted to apply or to gild the gold foil 88 onto the pen container 2.

Before winding onto the receiving or storing pulley 89, the gold foil 88 is preferably engaged onto or around one or more rollers 90, and one of the rollers 90 is coupled to a motor 98 with a coupling device 99, best shown in FIGS. 20, 21, such as a gearing device, or a pulley-and-belt device, or a sprocket-and-chain device 99, or the like, for allowing the gold foil 88 to be unfolded from the spool 87 and to be wound or engaged onto or received in the pulley 89.

A frame 91 is disposed on the table 10, and a bolt 92 is rotatably attached to the frame 91, and a die device 93 is threaded with the bolt 92 and is thus movable or adjustable up and down relative to the frame 91 by rotating the bolt 92 relative to the frame 91. The die device 93 includes a heatable die member 97 rotatably attached thereto, for engaging with the gold foil 88, before the gold foil 88 is wound or engaged onto or received in the pulley 89, and for stamping or printing or applying the gold foil 88 onto the pen containers 2.

An endless conveyer belt or device 94 is rotatably around two or more rollers 95, and disposed or arranged below the die member 93, and one of the rollers 95 is coupled to and driven by a motor 96, in order to receive the pen container 2 from the boards 40, and to resiliently engage with and to move the pen container 2 over the die member 97 of the die device 93 and the gold foil 88, and thus for allowing the pen container 2 and the gold foil 88 to be forced or clamped toward each other by the die member 97 and the conveyer device 94, and thus for allowing the gold foil 88 to be stamped or printed or applied onto the pen containers 2 as the gilding 9.

The eyebrow pencil 1 may thus be made by the disclosed eyebrow pencil making machine which includes a pusher 26 to push the tubular pen containers 2 from a trough 12 onto one or more boards 40, and one or more panels 42 may be moved relative to the boards 40, to move or feed the pen containers 2 forwardly step by step, and thus to allow the ends of the pen containers 2 to be shaped or machined or formed into the peripheral recess 5 and the inclined surface 6 by the tool member 63, 64 respectively, and to allow the eyebrow material or core 4 to be filled or engaged into the bores 3 of the tubular pen containers 2 respectively by the outlet nozzle 69 of the reservoir 68, and then to allow the rear caps 7 and the front covers 8 to be attached to the ends of the tubular pen containers 2 by the actuator tongues 84.

The presser 50 includes a number of projections 54 to engage with the pen containers 2, and to stably fix or retain the pen containers 2 on top of the boards 40, and thus for allowing the pen containers 2 to be machined or to be filled with the eyebrow materials 4 into the bores 3 of the pen containers 2.

The pen containers 2 may then be applied or stamped or printed with the gilding 9 by the die member 97 and the gold foil 88 and the conveyer device 94, such that the eyebrow pencil 1 may be easily and automatically made in mass production, without much labor works.

Accordingly, the eyebrow pencil making machine in accordance with the present invention includes a series of worming or machining stations to make the eyebrow pencils in series, and to allowing the eyebrow pencils to be easily and quickly made automatically or in mass production.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pencil making machine comprising:
    a table,
    a trough disposed on said table for receiving a plurality of pen containers,
    at least one board disposed on said table, and including a plurality of depressions formed thereon, to receive and to support said pen containers thereon,
    means for feeding said pen containers forwardly into said depressions of said at least one board step by step,
    two tool devices disposed on said table, and each including a tool member provided therein, for engaging with and for machining ends of said pen containers,
    means for moving said tool members toward and away from said pen containers, to allow said tool members to engage with and to machine the ends of said pen containers,
    a reservoir disposed on said table for receiving a material, and including an outlet nozzle for supplying the material into bores of said pen containers, and
    a block slidably supported on said table, and movable toward and away from said pen containers, to move said pen containers toward said outlet nozzle of said reservoir, and to allow the material to be filled into the bores of said pen containers.

2. The pencil making machine as claimed in claim 1, wherein said trough includes an inclined ramp provided therein to support and to supply tubular said pen containers forwardly.

3. The pencil making machine as claimed in claim 1 further comprising a bar rotatably supported on said table with a pivot axle, and a lever rotatably supported on said trough with a pivot pole, and said lever is movable relative to said bar, to feed said pen containers one by one.

4. The pencil making machine as claimed in claim 3, wherein said pivot axle includes a cam secured thereon, an arm is secured to said pivot pole and includes a fork having a groove formed therein to slidably receive said cam, and to said lever toward and away from said bar in reciprocating action.

5. The pencil making machine as claimed in claim 1 further comprising a presser slidably supported on said table, and movable toward said at least one board, to selectively engage with and to retain said pen containers on said at least one board.

6. The pencil making machine as claimed in claim 5, wherein said presser includes a plurality of projections extended downwardly therefrom, for engaging with and for pressing said pen containers onto said at least one board.

7. The pencil making machine as claimed in claim 5, wherein said presser includes a column slidably attached to said table and movable up and down relative to said table, and a spring engaged onto said column, and engaged with said presser, for biasing said presser to engage with and to retain said pen containers on said at least one board.

8. The pencil making machine as claimed in claim 1, wherein each of said tool devices includes a vacuum opening formed therein for vacuuming chips cut from said pen containers by said tool members.

9. The pencil making machine as claimed in claim 1, wherein said moving means includes two shafts coupled to and driven by a motor, and two links and cranks coupled between said shafts and said tool devices, to move said tool devices toward and away from each other in reciprocating action.

10. The pencil making machine as claimed in claim 1, wherein said block includes a cone-shaped cavity formed therein for forming an inclined surface on said pen container.

11. The pencil making machine as claimed in claim 1, wherein said block includes a bracket secured thereto, and a cam rotatably supported on said table and engageable with said bracket, to move said bracket and said block toward and away from said pen containers.

12. The pencil making machine as claimed in claim 11, wherein said table includes a seat disposed thereon, a rod slidably engaged through said bracket and slidably engaged into said seat and having a rounded member secured thereto for engaging with said cam.

13. The pencil making machine as claimed in claim 1 further comprising a vibrator receptacle disposed on said table for receiving and supplying rear caps, and an actuator tongue slidably disposed on said table and engageable with said rear caps, for forcing said rear caps onto ends of said pen containers respectively.

14. The pencil making machine as claimed in claim 13, wherein said vibrator receptacle includes an outlet pipe to receive said rear cap in series, a pedestal disposed below said outlet pipe and having a slot to receive said rear caps, and said actuator tongue is slidably engaged in said slot of said pedestal and is engageable with said rear caps supported on said pedestal.

15. The pencil making machine as claimed in claim 1 further comprising a vibrator receptacle disposed on said table for receiving and supplying front covers, and an actuator tongue slidably disposed on said table and engageable with said front covers, for forcing said front covers onto ends of said pen containers respectively.

16. The pencil making machine as claimed in claim 15, wherein said vibrator receptacle includes an outlet pipe to receive said front cover in series, a pedestal disposed below said outlet pipe and having a slot to receive said front covers, and said actuator tongue is slidably engaged in said slot of said pedestal and is engageable with said front covers supported on said pedestal.

17. The pencil making machine as claimed in claim 1 further comprising a die member, a foil engaged over said die member, and a conveyer device disposed below said die member, to receive and to support said pen containers thereon, and to move said pen containers and said foil over said die member, to allow said foil to be applied onto said pen containers.

18. The pencil making machine as claimed in claim 17 further comprising a frame supported on said table, and said die member is adjustably attached to said frame with a bolt.

19. The pencil making machine as claimed in claim 17 further comprising a spool and a pulley rotatably supported on said table, to receive said foil, and to have said foil to be unfolded from said spool and to be engaged around said pulley.

* * * * *